United States Patent [19]
Fletcher et al.

[11] 3,749,123
[45] July 31, 1973

[54] DUAL STAGE CHECK VALVE

[76] Inventors: James C. Fletcher, Administrator of the National Aeronautics and Space Administration with respect to an invention by; David E. Whitten, North Hollywood, Calif.

[22] Filed: Dec. 10, 1971

[21] Appl. No.: 206,698

[52] U.S. Cl. ............................ 137/516.27, 137/535
[51] Int. Cl. ............................................. F16k 15/00
[58] Field of Search .................... 137/494, 474, 508, 137/516.25, 516.27, 516.29, 535

[56] References Cited
UNITED STATES PATENTS

| | | | |
|---|---|---|---|
| 1,903,338 | 4/1933 | Horne | 137/508 X |
| 2,351,190 | 6/1944 | Carlson | 137/516.27 X |
| 2,633,148 | 3/1953 | Kelly | 137/508 X |
| 3,234,959 | 2/1966 | Feinberg | 137/494 |

FOREIGN PATENTS OR APPLICATIONS

| | | | |
|---|---|---|---|
| 544,524 | 4/1942 | Great Britain | 137/508 |
| 585,196 | 10/1959 | Canada | 137/508 |

*Primary Examiner*—Harold W. Weakley
*Attorney*—Edward E. Fein, John R. Manning et al.

[57] ABSTRACT

A dual stage seat valve head arrangement is provided consisting of a primary sealing point located between a fixed orifice seat and a valve poppet, and a secondary sealing point between an orifice poppet and a valve poppet. Upstream of the valve orifice is a flexible, convoluted metal diaphragm attached to the orifice poppet. Downstream of the valve orifice, a finger spring exerts a force against the valve poppet, tending to keep the valve in a closed position. The series arrangement of a double seat and poppet is able to tolerate small particle contamination while minimizing chatter by controlling throttling or metering across the secondary seat, thus preserving the primary sealing surface.

5 Claims, 2 Drawing Figures

Patented July 31, 1973

3,749,123

DAVID E. WHITTEN
INVENTOR.

BY
ATTORNEY

DUAL STAGE CHECK VALVE

ORIGIN OF THE INVENTION

The invention described herein was made in the performance of work under a NASA contract and is subject to the provisions of Section 305 of the National Aeronautics and Space Act of 1958, Public Law 85-568 (72 Statute 435; 42 U.S.C. 2457).

BACKGROUND OF THE INVENTION

1. Field of the Invention

The present invention relates to a dual stage check valve which may be utilized for cryogenic supply systems for space flight environmental control systems.

2. Description of the Prior Art

Known check valves utilized in space flight environmental control systems normally operate within a very small opening distance. Chattering and entrapment of contaminants on the sealing surfaces of known check valves have resulted in excessive valve leakage. The valve chatter produces accelerated wear on the sealing surfaces and contamination entrapment between the sealing surfaces prevents complete closure of the valve.

Among the prior art United States patents which have been considered in the evaluation of the present invention are U.S. Pat. No. 2,553,919 issued May 22, 1951, to E. Hug et al. and U.S. Pat. No. 3,257,521 issued June 21, 1966, to Brandl. Hug discloses a valve having two poppets mounted on opposite sides of a fixed plate. Two sealing surfaces are provided with one sealing surface between the downstream poppet and the fixed plate and the other sealing surface between the two poppets. The upstream poppet is mounted on a flexible membrane and the two poppets move together as the valve starts to open.

Brandl discloses a check valve with a poppet biased closed by a leaf spring. The poppet seals against a valve seat member mounted on a diaphragm.

SUMMARY OF THE INVENTION

The present invention is related to a dual stage check valve which incorporates two improvements which eliminate problems associated with prior art check valves. One improvement is provided through use of a double seat and poppet arrangement operating in series. In this manner an opening arrangement is provided which can tolerate contamination of a certain particle size without degrading valve sealing capability.

The second improvement of the dual stage check valve of the present invention is in chatter effect and control. Chatter is minimized through the use of a sealing spring with low mass and natural frequency above the range which causes chatter of the poppet. If chatter should occur, the double seat configuration allows all excessive wear to take place on the secondary sealing interface with no wear or damage to the primary sealing interface. The double stage series configuration is arranged so that if contamination entrapment and excessive wear occur, they are both concentrated on the secondary sealing interface thus leaving the primary sealing capability unimpaired.

DETAILED DESCRIPTION

Figure 1:
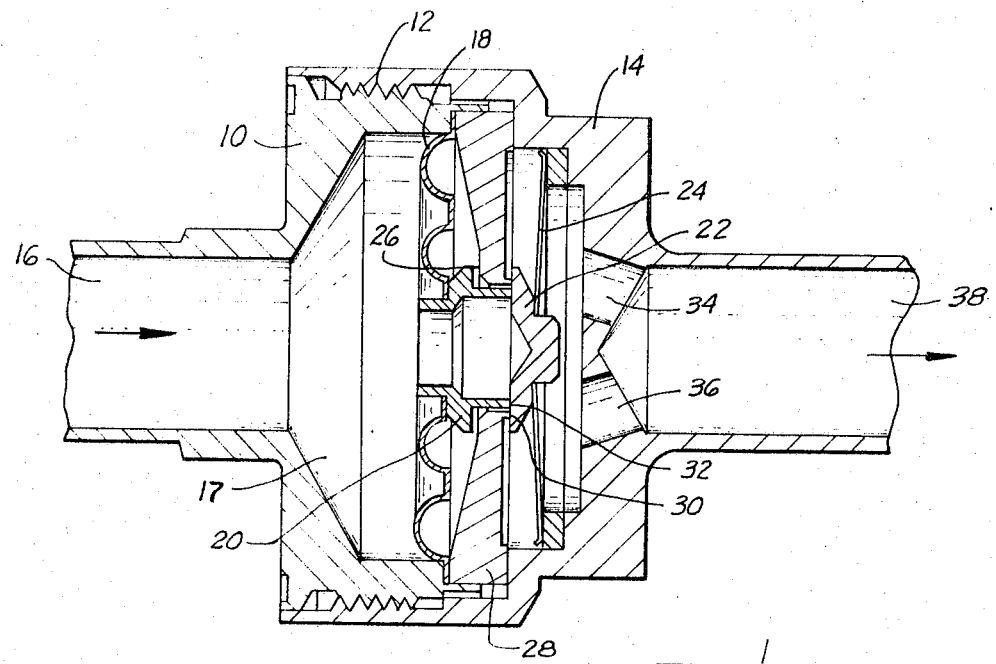
FIG. 1 is a sectional plan view of the dual stage check valve of the present invention.

FIG. 1 is a sectional plan view of the dual stage check valve of the present invention. Member 10 may be threadedly coupled through threaded portion 12 to member 14. Member 10 has an inlet port 16 which communicates with enlarged diameter opening 17. Fluid entering the valve through inlet port 16 impinges on a metal diaphragm 18 and orifice poppet 20 and valve poppet 22 causing a force to be exerted against finger spring 24. As the force of the fluid pressure acting on the impinged surface area exceeds the finger spring force, the orifice poppet assembly and valve poppet travel axially until movement is prevented by a stop 26 acting against the shoulder of orifice poppet 20. At the same time, this movement causes separation between the primary sealing surfaces at fixed orifice seat 28 and sealing point 30 independent of flow requirements and a seal is retained across the secondary seat at orifice poppet 20. Secondary sealing point 32 is shown on the orifice poppet 20. As fluid continues to impinge on the valve poppet 22 and as the force of the fluid pressure acting against the area of the poppet exceeds the finger spring force, the poppet 22 moves off of the secondary seat 32 allowing fluid flow across the valve through ports 34 and 36 and outlet 38.

It will be appreciated that the dual stage seat and valve arrangement of the present invention includes primary sealing point 30 between fixed orifice seat 28 and valve poppet 22 and a secondary sealing point 32 between orifice poppet 20 and valve poppet 22. Upstream of the valve orifice, a flexible, convoluted metal diaphragm 18 is attached to the orifice poppet 20, permitting axial movement of the secondary seat and limiting gas flow through only the central hole in the secondary seat. Downstream of the valve orifice, a finger spring 24 exerts a force against valve poppet 22 tending to keep the valve in a closed position until the valve is operated as explained previously.

Figure 2:
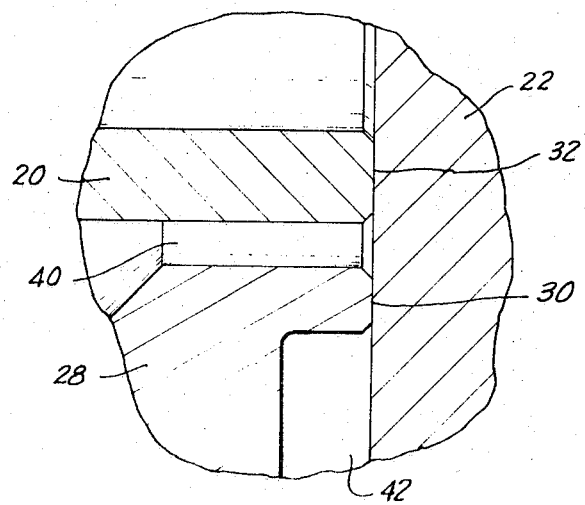
FIG. 2 is an enlarged view of the primary and secondary sealing points of the dual stage check valve shown in FIG. 1.

FIG. 2 is an enlarged view of the primary and secondary sealing points of the dual stage check valve shown in FIG. 1. Valve poppet 22 is shown positioned against primary sealing point 30 on fixed orifice seat 28, and also against secondary sealing point 32 on orifice poppet 20. It will be appreciated that there is communication between chamber 40 and chamber 42 when the primary sealing point 30 is opened through movement of orifice poppet 20 coupled to the metal diaphragm 18. Secondary sealing point 32 is broken through movement of the valve poppet 22 away from orifice poppet 20.

Thus it will be appreciated that the present invention provides a dual stage check valve in which the primary seat is separated from the valve poppet by a controlled amount that is always greater than that required for low flow conditions while the secondary seat separation amount is dependent on flow conditions. The separation pattern allows the secondary seat to fulfill the valve opening and sealing functions which in turn cause the secondary seat to be subject to contamination entrapment and wear while the primary seat is preserved for reseat and sealing purposes. The large controlled separation across the primary valve seat allows a free flow path to flush contaminants from the valve seat region and insures chatter-free operation between the primary sealing surfaces. The primary valve retains its contaminant-free and surface-finish character throughout the operating life of the check valve. The present invention has particular adaptability to an environment which requires maximum demand flow with short poppet valve travel. Also low leakage sealing capability is unimpaired by contamination or chatter. The valve of the present invention is thought to allow extension of the useful life of high cyclic valves in various applications.

I claim:

1. A dual stage check valve having primary and secondary sealing surfaces comprising:

a housing defining an inlet port and an outlet port;

an annular fixed orifice seat axially positioned between said inlet and outlet ports;

valve poppet means biased against the direction of fluid flow toward said fixed orifice seat, forming said primary sealing surfaces;

fluid responsive annular orifice poppet means concentrically disposed for limited reciprocal axial movement within said fixed orifice seat for lifting said valve poppet means away from said fixed orifice seat, and for forming said secondary sealing surfaces in conjunction with said valve poppet means, said orifice poppet means and said fixed orifice seat defining an annular gap therebetween for providing fluid wash flow across said primary sealing surfaces; and means for directing fluid flow through only the center of said orifice poppet means.

2. A dual stage check valve as defined in claim 1 wherein said means for directing fluid flow through only the center of said orifice poppet means comprises an annular diaphragm fixedly attached at its inner circumference to the outer surface of said orifice poppet means and at its outer circumference to the inner surface of said housing.

3. A dual stage check valve as defined in claim 1 further including stop means on said fixed orifice seat for limiting axial travel of said orifice poppet means.

4. A dual stage check valve as defined in claim 2 wherein said diaphragm defines a fluid flow reaction area for operation of said orifice poppet means.

5. A dual stage check valve as defined in claim 4 wherein said fluid flow reaction area of said diaphragm is greater than that presented by said valve poppet means whereby said valve will operate in two stages.

* * * * *